Figure 1:
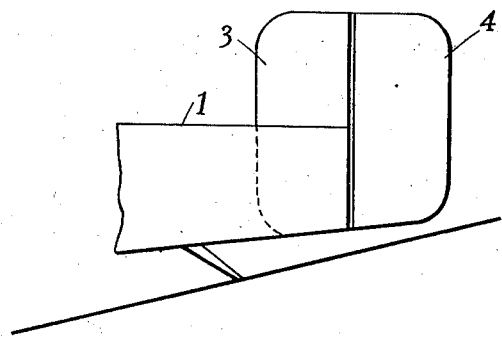

April 6, 1937.  J. TEISSEYRE ET AL  2,076,283
DISPLACEABLE RUDDER FOR AIRCRAFT
Filed April 3, 1935   3 Sheets-Sheet 1

INVENTORS
Jerry Teisseyre
August Zdaniewski
BY
J. Soral
ATTORNEY

April 6, 1937.  J. TEISSEYRE ET AL  2,076,283
DISPLACEABLE RUDDER FOR AIRCRAFT
Filed April 3, 1935   3 Sheets-Sheet 2

INVENTORS
Jerzy Teisseyre,
August Zdaniewski
by S. Sokal.
ATTORNEY

April 6, 1937.                J. TEISSEYRE ET AL                2,076,283
                        DISPLACEABLE RUDDER FOR AIRCRAFT
                        Filed April 3, 1935        3 Sheets-Sheet 3
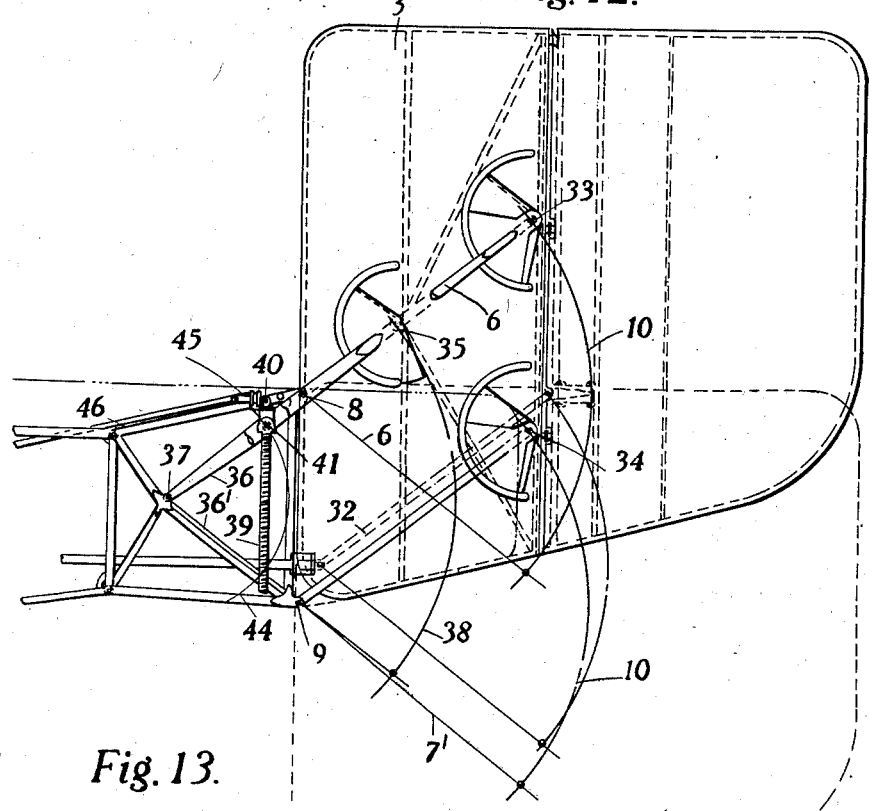
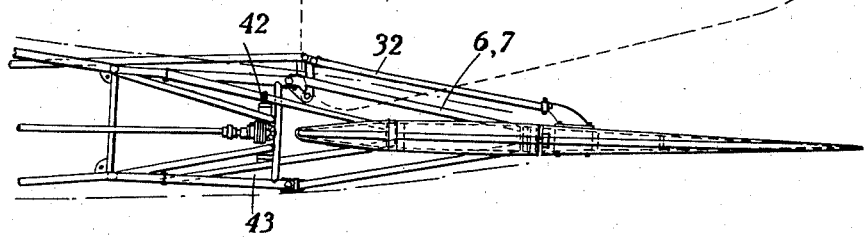

Patented Apr. 6, 1937

2,076,283

UNITED STATES PATENT OFFICE 2,076,283

DISPLACEABLE RUDDER FOR AIRCRAFT

Jerzy Teisseyre, Warsaw, and August Zdaniewski, Biala Podlaska, Poland

Application April 3, 1935, Serial No. 14,546
In Germany April 3, 1934

8 Claims. (Cl. 244—87)

The present invention relates to vertically displaceable rudders for aircraft.

Rudders for aircraft which are inter alia vertically displaceable by the turning of an axis located outside of the rudder are already known. These known arrangements which served for particular purposes have, in view of their complicated structure, only been employed in exceptional cases. In ordinary aircraft the rudder is always arranged above the body. This arrangement is unfavourable, particularly in the case of military aircraft, inasmuch as the rudder which projects beyond the body hinders the utilization of the shooting range when firing from a rearwardly directed machine gun.

The present invention aims not only at leaving the rear shooting range entirely free in military aircraft, but also at increasing the reliability of operation of the rudder during a possible spinning or nose-dive of the aircraft.

The novel feature of the invention resides in the fact that the axle or pivot upon which the movable part of the rudder turns is displaceable vertically parallel to the said axle or pivot being located between the said part itself or in the direction of its own axis and the fixed plane. Hereby the result is obtained that when the aircraft is at rest the rudder—as is the case in the usual known aircraft—remains in the raised position, whilst on the other hand during the flight, if it is desired to fire towards the rear, the rudder can be downwardly displaced so that it does not project beyond the body at all. The operative rudder surface is then located below the body. Moreover, according to the invention the fixed plane can be turned through a certain angle with regard to the longitudinal axis of the aircraft, and further the rim which is pivotally connected to the rudder may be turned into certain angular positions in the one or the other direction when the current of air arising from the propeller is directed above the rudder differently from below.

The displacement of the steering surface may be effected according to the invention by any suitable means, for example by means of a straight link, a straight control member or parallel control members or guides.

Figure 2:
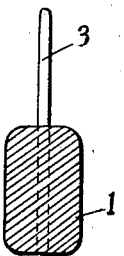
Figure 3:
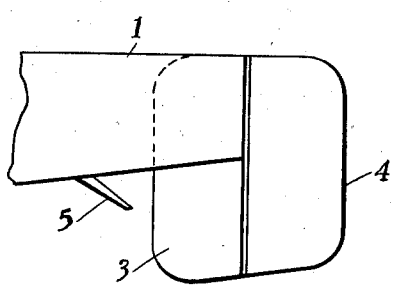
Figure 4:
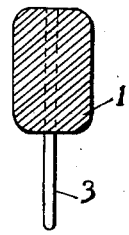
Figure 5:
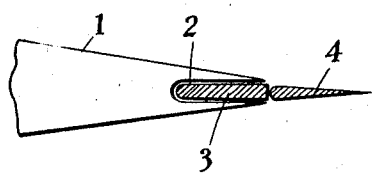
Figure 6:
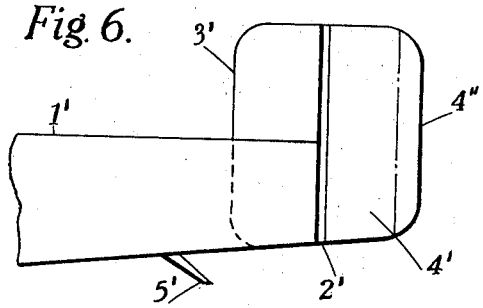

Some preferred constructional forms of rudders according to the invention are illustrated by way of example in the accompanying drawings, in which:

Fig. 1 is a side view of the stern of the aircraft with the rudder in the raised position, and Fig. 3 a similar view with the rudder in the lowered position, Figs. 2 and 4 are vertical cross sections corresponding to Figs. 1 and 3, Fig. 5 is a plan corresponding to Fig. 1 with the rudder shown in section, Fig. 6 is a side view of the stern of an aircraft with the rudder in the raised position illustrating, a modified constructional form.

Figure 7:
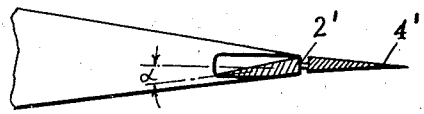
Figure 8:
Figure 9:
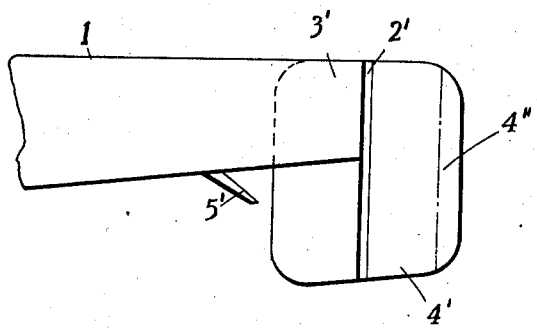
Figure 10:
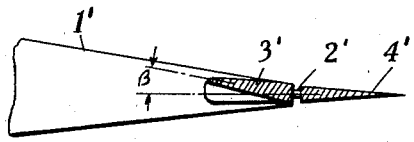
Figure 11:
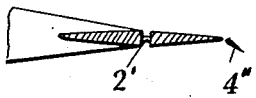

Figs. 7 and 8 are plans corresponding to Fig. 6, showing cross sections of the fixed plane and the rudder in the normal position and in a deflected position, Fig. 9 is a side view of the stern of the aircraft with the rudder in the lowered position, Figs. 10 and 11 are plans corresponding to Fig. 9 showing the fixed plane and the rudder in the normal position and in a deflected position, in section.

Fig. 12 is a side view and Fig. 13 is a plan of an arrangement for moving the fixed plane and the rudder by means of parallel guides.

Referring to the drawings:

In the rear part 1 (Figs. 1, 3 and 5) of the body a vertical slot 2 is provided in which the fixed stabilizing plane 3 pivotally connected with the rudder 4 is mounted so as to be displaceable or slidable. The whole of the rudder proper 4 is located outside of the body of the aircraft, so that the whole of the steering surface of the rudder is operative in every vertical position of the rudder. Below the end of the body of the aircraft a tail-skid 5 is arranged. The displacement of the parts 3 and 4 can be effected by means known per se.

In the construction according to Figs. 6 to 11 the fixed plane 3' together with the rudder 4' is likewise arranged in the stern 1' of the aircraft, so as to be upwardly and downwardly displaceable in such manner that the rudder 4' is capable of turning around the axle 2' of the pivot between the fixed plane and the rudder. During the upward and downward movement from the upper position (Fig. 6) to the lower position (Fig. 9), the axle 2' always moves parallel to itself or in the direction of its own axis.

It is, however, possible to move the fixed plane 3' around the axle 2' through an angle $\alpha$ in the upper position and through an angle $\beta$ in the lower position (Fig. 7 and Fig. 10 respectively). The rudder 4' is pivotally connected to an end member 4'', which can, if desired, be likewise turned towards the right or towards the left, for example for the purpose of stabilizing the direction of the aircraft in the case when the current of air produced by the propeller is in a somewhat different direction above the body from below. Below the body 1' the tail-skid 5' is arranged.

The upward and downward movement of the rudder takes place either on a straight line or on a curve.

In the arrangement shown in Figs. 12 and 13 the rudder is moved by means of parallel guides over an arc of a circle.

The triangular guide or control members 6, 7 and 36 which are parallel to one another and of the same operative length, are pivotally connected at the one end at 8, 9 and 37 to the stern of the aircraft, and at the other end at 33, 34 and 35 to the fixed plane 3''. The points 8 and 9 as also the points 33 and 34 are located on vertical lines and the triangle formed by the points 33, 34 and 35 is similar to the triangle formed by the points 8, 9 and 37.

When a downward movement of the guide members 6, 7 and 36 into the position 6', 7' and 36' indicated in dotted lines takes place, the fixed plane is displaced in a parallel position vertically downwards, the points 33, 34 meanwhile moving on the arc 10 and the point 35 on the arc 38. For effecting the turning movement of the guide members 6, 7 and 37 a swinging movement is imparted to one of them, for example to 36. This is effected by means of a screwed spindle 39 rotatably mounted at 40, which spindle is driven by means of a pair of bevel wheels 45 from the driving shaft 46 pivotally connected thereto. In the guide member 36 a transverse batten 42 is arranged, which is provided with a nut 41 and which is adapted to turn about the axis 43.

When the screwed spindle 39 is turned, the nut 41 engaging therewith moves on the arc 44 having its centre at 37, whilst the end points 35, 33, 34 move at the same time on the arcs 38 and 10 respectively. In consequence of this the fixed plane 3'' together with the rudder takes up the lower position indicated in dotted lines.

For the purpose of swinging the rudder laterally in every vertical position a rod 32 serves, one end of which is pivotally connected by means of cross or ball linkage to a projection of the rudder, and the other end of which is similarly connected by means of cross or ball linkage to the steering push rod of the aircraft. The direction of the push rod 32 is parallel to that of the guide members 6 and 7 and its length agrees with that of the latter. In consequence of this the push rod 32 describes during each vertical displacement of the fixed plane 3'', the same arc as the linkage members 6 and 7, and the rudder can therefore be swung by means of the rod 32 in any vertical position which it occupies.

The arrangement for swinging the fixed plane 3'' and the end member of the rudder according to Figs. 7, 8, 10 and 11 has not been particularly shown on the drawings. The means employed for this purpose are known from similar arrangements customarily employed for fixed planes and rudders.

Having now particularly described and ascertained the nature of our said invention and in what manner the same is to be performed, we declare that what we claim is:—

1. A vertically displaceable air rudder for aircraft, comprising in combination: a relatively fixed planiform part; a movable planiform part; and a pivot member pivotally connecting said fixed and movable parts with one another and located between the two said parts, said relatively fixed part being displaceable vertically in the direction of its own axis from a position extending above the body of said aircraft to a position extending below the same, whereby said movable part is brought into alternative operative positions as an air rudder member.

2. A vertically displaceable air rudder for aircraft, comprising in combination: a relatively fixed planiform part; a movable planiform part; a pivot member pivotally connecting said fixed and movable parts with one another and located between the two said parts; and a vertically slotted part on the body of the aircraft, in which last named part said relatively fixed part is displaceable vertically in the direction of its own axis from a position extending above the body of said aircraft to a position extending below the same, whereby said movable part is brought into alternative operative positions as an air rudder member.

3. A vertically displaceable air rudder for aircraft, comprising in combination: a relatively fixed planiform part; a movable planiform part; a pivot member pivotally connecting said fixed and movable parts with one another and located between the two said parts, said relatively fixed part being displaceable vertically in the direction of its own axis from a position extending above the body of said aircraft to a position extending below the same, whereby said movable part is brought into alternative operative positions as an air rudder member; and a link guide member for displacing said fixed part perpendicularly to the body of the aircraft.

4. A vertically displaceable air rudder for aircraft, comprising in combination: a relatively fixed planiform part; a movable planiform part; a pivot member pivotally connecting said fixed and movable parts with one another and located between the two said parts, said relatively fixed part being displaceable vertically in the direction of its own axis from a position extending above the body of said aircraft to a position extending below the same, whereby said movable part is brought into alternative operative positions as an air rudder member; a parallel link guide for displacing said fixed part relatively to the body of the aircraft; and a perpendicularly located arcuate member upon which said fixed part is displaced by said parallel link guide.

5. A vertically displaceable air rudder, as specified in claim 4, wherein said fixed part of the rudder is linked to the body of the aircraft by means of a triangular linkage comprising parallel and equally long link members, the line connecting the points of application of two link members being a vertical line.

6. A vertically displaceable air rudder, as specified in claim 4, wherein said fixed part of the rudder is linked to the body of the aircraft by means of a triangular linkage comprising parallel and equally long link members, the line connecting the points of application of two link members being a vertical line; the one of said link members being adapted by the aid of known means, which may, for example, comprise a screw and a nut pivotally connected to said last named link member, to swing about its point of application on the body of the aircraft.

7. A vertically displaceable air rudder, as specified in claim 4, wherein said fixed part of the rudder is linked to the body of the aircraft by means of a triangular linkage comprising parallel and equally long link members, the line connecting the points of application of two link members being a vertical line; the one of said link members being adapted by the aid of known means, which may, for example, comprise a screw and a nut pivotally connected to said last named link member, to swing about its point of application on the body of the aircraft; and a push rod adapted to swing the rudder laterally, said push rod agreeing in length and direction with the length and direction of said parallel link guide and being pivoted at both ends so as to be universally rotatable.

8. A vertically displaceable air rudder, as specified in claim 4, wherein said fixed part of the rudder is linked to the body of the aircraft by means of a triangular linkage comprising parallel and equally long link members, the line connecting the points of application of two link members being a vertical line; the one of said link members being adapted by the aid of known means, which may, for example, comprise a screw and a nut pivotally connected to said last named link member, to swing about its point of application on the body of the aircraft; a push rod adapted to swing the rudder laterally, said push rod agreeing in length and direction with the length and direction of said parallel link guide and being pivoted at both ends so as to be universally rotatable; and an end member on the rudder; said fixed part of the rudder being adapted to be swung through a definite angle to the longitudinal axis of the aircraft, and said end member being adapted to be swung through a definite angle with regard to the plane of the rudder.

JERZY TEISSEYRE.
AUGUST ZDANIEWSKI.